(12) United States Patent
Areljung et al.

(10) Patent No.: US 11,088,863 B2
(45) Date of Patent: Aug. 10, 2021

(54) REMOTE CONTROL SYSTEM FOR CONTROLLING A DOMESTIC APPLIANCE

(71) Applicant: ELECTROLUX APPLIANCES AKTIEBOLAG, Stockholm (SE)

(72) Inventors: Daniel Areljung, Stockholm (SE); Stefano Cladi, Forli (IT); Harald Hoffmann, Rothenburg ob der Tauber (DE)

(73) Assignee: Electrolux Appliance Aktiebolag, Stockholm (SE)

(*) Notice: Subject to any disclaimer, the term of this patent is extended or adjusted under 35 U.S.C. 154(b) by 0 days.

(21) Appl. No.: 16/626,612

(22) PCT Filed: Jul. 3, 2018

(86) PCT No.: PCT/EP2018/068007
§ 371 (c)(1),
(2) Date: Dec. 26, 2019

(87) PCT Pub. No.: WO2019/011729
PCT Pub. Date: Jan. 17, 2019

(65) Prior Publication Data
US 2020/0136850 A1 Apr. 30, 2020

(30) Foreign Application Priority Data
Jul. 11, 2017 (EP) .................................... 17180628

(51) Int. Cl.
*H04L 12/28* (2006.01)
*F24C 7/08* (2006.01)
(Continued)

(52) U.S. Cl.
CPC .......... *H04L 12/2809* (2013.01); *F24C 7/083* (2013.01); *G08C 17/02* (2013.01);
(Continued)

(58) Field of Classification Search
None
See application file for complete search history.

(56) References Cited

U.S. PATENT DOCUMENTS 5,321,229 A * 6/1994 Holling ................... F24C 7/087
219/445.1
5,349,162 A * 9/1994 Holling ................... F24C 7/082
219/445.1
(Continued)

FOREIGN PATENT DOCUMENTS

EP       3255621 A1 * 12/2017 ............. G08C 23/04
WO      2015168243 A1    11/2017

OTHER PUBLICATIONS

International Search Report and Written Opinion in PCT/EP2018/068007 dated Oct. 18, 2018, 12 pages.

*Primary Examiner* — Lashonda T Jacobs
(74) *Attorney, Agent, or Firm* — Pearne & Gordon LLP

(57) ABSTRACT

The present invention relates to a remote control system for controlling a first domestic appliance (10), in particular a cooking hob. The remote control system comprises the first domestic appliance (10) and at least one remote device (12). The domestic appliance (10) is connected to the remote device (12) via an acoustic connection (20). The domestic appliance (10) is controllable by the remote device (12), if a predefined sound signal from the domestic appliance (10) to the remote device (12) via the acoustic connection (20) is recognised by said remote device (12).

19 Claims, 1 Drawing Sheet

(51) Int. Cl.
*G08C 17/02* (2006.01)
*H04L 29/08* (2006.01)

(52) U.S. Cl.
CPC .......... *H04L 12/2827* (2013.01); *H04L 67/12* (2013.01); *H04L 2012/285* (2013.01); *H04L 2012/2841* (2013.01)

(56) References Cited

U.S. PATENT DOCUMENTS

| | | | | |
|---|---|---|---|---|
| 5,378,874 A * | 1/1995 | Holling | .................. | F24C 7/082 219/414 |
| 5,746,114 A * | 5/1998 | Harris | .................... | F24C 7/082 99/331 |
| 6,380,866 B1 * | 4/2002 | Sizer, II | ............. | H04L 12/2803 340/12.5 |
| 6,480,753 B1 * | 11/2002 | Calder | ................. | H05B 6/6435 700/83 |
| 6,587,739 B1 * | 7/2003 | Abrams | ................. | G05B 15/02 340/12.32 |
| 6,956,461 B2 * | 10/2005 | Yoon | .................. | G05B 19/0421 340/12.52 |
| 8,487,748 B2 * | 7/2013 | Morillas Bueno | ..... | G08C 23/04 340/13.24 |
| 9,439,530 B2 * | 9/2016 | Logan | .................. | G09B 19/0092 |
| 9,769,245 B2 * | 9/2017 | Brooker | ............. | H04L 12/2823 |
| 9,832,820 B2 * | 11/2017 | Darney | ................. | E05B 47/026 |
| 9,966,070 B2 * | 5/2018 | Koetz | ................ | G06K 9/00288 |
| 10,185,766 B2 * | 1/2019 | Tannenbaum | ......... | G06F 16/686 |
| 10,209,690 B2 * | 2/2019 | Tannenbaum | ...... | H04L 12/2816 |
| 10,629,066 B2 * | 4/2020 | Gordijn | ................. | G08C 23/04 |
| 2002/0005787 A1 * | 1/2002 | Gabai | .................. | H04B 1/202 340/12.29 |
| 2003/0001820 A1 * | 1/2003 | Hou | ........................ | G06F 3/021 345/168 |
| 2006/0047513 A1 * | 3/2006 | Chen | ....................... | G10L 15/26 704/246 |
| 2008/0157936 A1 * | 7/2008 | Ebrom | ................. | H04L 12/2803 340/286.02 |
| 2010/0134317 A1 * | 6/2010 | Breuil | .................... | G08C 17/02 340/12.28 |
| 2010/0259398 A1 * | 10/2010 | Kim | ..................... | H04M 11/045 340/635 |
| 2010/0286801 A1 * | 11/2010 | Yum | ....................... | F25D 29/00 700/90 |
| 2011/0182445 A1 * | 7/2011 | Atsmon | .................. | G06F 21/35 381/123 |
| 2012/0092139 A1 * | 4/2012 | Ehrensberger | ........ | A47L 15/006 340/12.23 |
| 2012/0146918 A1 * | 6/2012 | Kreiner | ................. | G06F 3/0481 345/173 |
| 2013/0289753 A1 * | 10/2013 | Boldt | ........................ | H02J 3/14 700/90 |
| 2014/0191856 A1 * | 7/2014 | Cho | ........................ | H04L 12/282 340/12.54 |
| 2014/0253389 A1 * | 9/2014 | Beauregard | ............. | G01S 11/16 342/458 |
| 2015/0019987 A1 * | 1/2015 | Kouda | .................... | H04L 67/02 715/744 |
| 2015/0234829 A1 * | 8/2015 | Yoshitake | ......... | G06F 16/24578 707/723 |
| 2015/0366411 A1 * | 12/2015 | Yang | .................... | A47K 5/1217 222/25 |
| 2016/0010872 A1 | 1/2016 | Aso et al. | | |
| 2016/0130466 A1 * | 5/2016 | Jagtap | .................... | B05D 3/007 427/372.2 |
| 2017/0026506 A1 * | 1/2017 | Haepp | ................. | H04M 1/72415 |
| 2017/0084275 A1 * | 3/2017 | Koetz | .................... | A47J 43/07 |
| 2017/0122569 A1 | 5/2017 | Johnson et al. | | |
| 2017/0135159 A1 | 5/2017 | Sorenson et al. | | |
| 2017/0170978 A1 * | 6/2017 | Luckhardt | ............... | F24C 7/087 |
| 2017/0205783 A1 * | 7/2017 | Tannenbaum | ...... | H04L 12/2816 |
| 2018/0252795 A1 * | 9/2018 | Kumar | .................... | G01S 1/725 |
| 2018/0365976 A1 * | 12/2018 | Gordijn | ................. | G08C 19/00 |
| 2019/0155844 A1 * | 5/2019 | Tannenbaum | .......... | G06F 16/61 |

\* cited by examiner

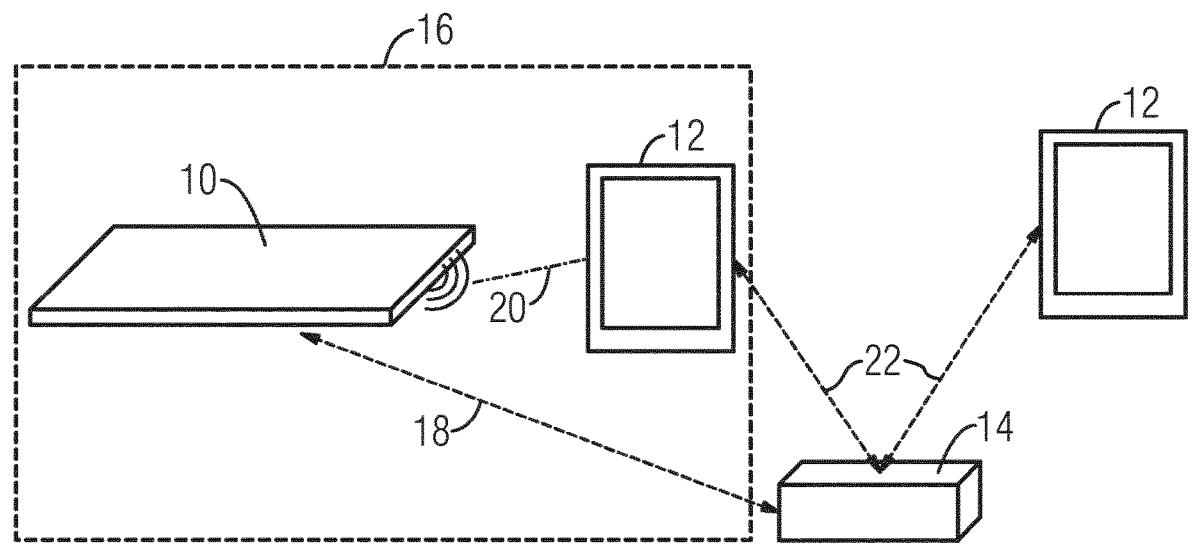

REMOTE CONTROL SYSTEM FOR CONTROLLING A DOMESTIC APPLIANCE

The present invention relates to a remote control system for controlling a domestic appliance. In particular, the present invention relates to a remote control system for controlling a cooking appliance. Preferably, the present invention relates to a remote control system for controlling a cooking hob. Further, the present invention relates to a method for controlling a domestic appliance by at least one remote device.

A remote control of many domestic appliances is not generally allowed due to legal safety issues. In particular, the remote control of a cooking hob is not allowed. However, the control of domestic appliances by remote device, e.g. smartphones or tablets, is increasing and desired by many users. The control of the domestic appliance by the remote device could be allowed, if the distance between the user and the domestic appliance would be controlled to be within a safe value in order to allow a manual control of the domestic appliance.

It is an object of the present invention to provide a remote control system for controlling a domestic appliance, wherein the distance between the domestic appliance and a user is reliably controlled by low complexity.

According to the present invention a remote control system for controlling a first domestic appliance is provided, wherein:
the remote control system comprises the first domestic appliance and at least one remote device,
the first domestic appliance is connected to the remote device via an acoustic connection, and
the first domestic appliance is controllable by the remote device, if a predefined sound signal from the first domestic appliance to the remote device via the acoustic connection is recognised by said remote device.

The main idea of the present invention is that the first domestic appliance, which may be a cooking hob, is controllable by the remote device only, if the predefined sound signal from the first domestic appliance to the remote device via the acoustic connection is recognised by said remote device. Effectively, the first domestic appliance is controllable by the remote device, if the distance between the remote control and the first domestic application does not exceed a predetermined value. There may be a sound level and/or an oscillation amplitude provided or predefined which may not be exceeded in order to ensure that the distance is kept within a predetermined value. The sound signal may be a sound sequence, e. g. a sequence of tones or the like.

The acoustic connection, or the sound signal, respectively, may either be within the audible range, which enables the user of the system to listen to the transmission of the sound signal, and in that to control the functionality. Alternatively, a non-audible level may be used, what is advantageous for a user who dislikes to be disturbed by a noisy environment.

Preferably, the first domestic appliance is controllable by the remote device, if the predefined sound signal from the first domestic appliance to the remote device via the acoustic connection is recognised by said remote device within a predefined time interval, after a control command has been sent from the remote device to the first domestic appliance.

In contrast it may be provided, that the first domestic appliance is not controllable by the remote device, if the predefined sound signal from the first domestic appliance to the remote device via the acoustic connection is not recognised by said remote device within the predefined time interval, after the control command has been sent from the remote device to the first domestic appliance.

In particular, the acoustic connection is a unidirectional connection from the first domestic appliance to the remote device.

A preferred embodiment of a remote device may be a smartphone, a tablet, a notebook or the like. Generally, it could be any device with smart control functionality, also a personal computer.

A particularly favourable embodiment of the remote control system comprises at least one device or second domestic appliance arranged in a joint network with the first domestic appliance, in particular a local network and/or a smart home network, wherein the first domestic appliance is connected to the device or to the second domestic appliance via a first connection, the remote device is connected to the device or second domestic appliance via a second connection, and the first domestic appliance is controllable by the remote device via the device, if the predefined sound signal from the first domestic appliance to the remote device via the acoustic connection is recognised by said remote device.

It may be further provided that the first domestic appliance is controllable, in particular only controllable, by the remote device if the predefined sound signal from the first domestic appliance to the remote device via the acoustic connection is recognised by said remote device within a predefined time interval, after a control command has been sent from the remote device to the first domestic appliance via the route comprising the second wireless connection, the device or second domestic appliance and the first wireless connection.

The device which is arranged in the joint network with the first domestic appliance may be a network coupling device, which may be a router or a digital assistant adapted to receive, to process and/or to transmit commands.

Advantageously, the first connection between the first domestic appliance and the device or second domestic appliance is a wireless local area network (WLAN) connection or a local area network connection. Additionally or alternatively, the second connection between the at least one remote device and the device or second domestic appliance may be a wireless local area network (WLAN).

Preferably, at least one of the first connection and the second connection is a Wi-Fi connection.

In particular, the remote device includes application software for generating the control command and/or for recognising the predefined sound signal.

One possibility for a sound signal transfer may be a mere sending of a sequence of tones or a sequence of a melody. Another option may be a use of a transmission via acoustic wave modulation on amplitude or frequency, a measure for a specification of this interaction. Such kind of acoustic wave modulation may be varied even within only one or very few sound signals or tones. Further, filtering means may be used within the remote device allowing identification and suppression of noises in the sound signal sent from the first domestic appliance.

In order to avoid that the first domestic appliance is opened up or unblocked for any kind of communication, what may cause a loss of control, the acoustic connection is preferably secured by a unique identification signal or any other kind of identifier which is added to the predefined sound signal or which is modulating or modifying the predefined sound signal.

Further, the present invention relates to a method for controlling a first domestic appliance by at least one remote device, wherein the first domestic appliance is connected to the remote device via an acoustic connection, and wherein the method comprises the steps of:

sending a control command from the remote device to the domestic appliance, sending a predefined sound signal from the first domestic appliance to the remote device via the acoustic connection, if the predefined sound signal is recognised by the remote device within a predefined time interval, then the first domestic appliance is controllable by said remote device, and if the predefined sound signal is not recognised by the remote device within the predefined time interval, then the domestic appliance is not controllable by said remote device.

Preferably, the predefined sound signal is a predefined sequence of tones.

In particular, the predefined time interval is between one and five seconds, preferably between two and four seconds, in particular three seconds.

Moreover, the predefined sound signal from the first domestic appliance to the remote device via the acoustic connection is repeated a number of times, after the control command from the remote device to the domestic appliance has been sent, wherein preferably the predefined sound signal is repeated one, two or three times.

In particular, the method is provided for the remote control system mentioned above.

The first domestic appliance is preferably controlled by the remote device via a device or a second domestic appliance arranged in a joint network with the first domestic appliance, wherein the first domestic appliance is connected to the device or second domestic appliance via a first connection, the remote device is connected to the device or second domestic appliance via a second connection and the first domestic appliance is controllable by the remote device via the device or the second domestic appliance if the predefined sound signal from the first domestic appliance to the remote device via the acoustic connection is recognised by the remote device.

The joint network for the first domestic appliance and the device or second domestic appliance may be a local network and/or a smart home network.

A particularly preferred method is defined by an acoustic connection which further comprises a unique identification signal, or the like, which is added to the predefined sound signal and/or is modulating or modifying in whatever way the predefined sound signal. With such kind of measure, the security in controlling the first domestic appliance is increased. The unique identification signal may be a repetitive signal, more preferred, however, is a unique identification signal which is randomly created by the first domestic appliance.

It may be beneficial to record and transform the unique identification signal by the remote device and to add the transformed unique identification signal to a control message, in particular to each control message, sent from the remote device to the first domestic appliance for a program or program parameter controlling. It is further beneficial to provide for the first domestic appliance to only accept a control message when it receives the transformed unique identification signal in addition.

Novel and inventive features of the present invention are set forth in the appended claims.

The present invention will be described in further detail with reference to the drawing, in which FIG. 1 illustrates a schematic perspective view of a remote control system for controlling a domestic appliance according to a preferred embodiment of the present invention.

FIG. 1 illustrates a schematic perspective view of a remote control system for controlling a domestic appliance 10 according to a preferred embodiment of the present invention. The remote control system comprises the domestic appliance 10, a remote device 12 and a router 14. In this example, the domestic appliance 10 is a cooking hob 10. In particular, the remote device 12 is a smartphone, a tablet, a notebook or the like.

The cooking hob 10 and the router 14 are connected via a first wireless connection 18. Preferably, the first wireless connection 18 is a wireless local area network (WLAN) connection. Alternatively, the cooking hob 10 and the router 14 may be connected via a local area network (LAN) connection. Further, the remote device 12 is connected to the router 14 via a second wireless connection 22. Preferably, the second wireless connection 22 is a wireless local area network (WLAN) connection. In particular, the first wireless connection 18 and/or the second wireless connection 22 are Wi-Fi connections.

Further, the cooking hob 10 and the remote device 12 are connected via an acoustic connection 20. Said acoustic connection 20 is a unidirectional connection from the cooking hob 10 to the remote device 12. The cooking hob 10 includes a sound generating device, while the remote device 12 includes a microphone and a sound checking device. Said acoustic connection 20 provides an acoustic feedback from the cooking hob 10 to the remote device 12 in order to verify, if the remote device 12 is located inside a control range 16. Said control range 16 is a predefined area around the cooking hob 10. If the remote device 12 is located inside the control range 16, then the cooking hob 10 is controllable by said remote device 12. If the remote device 12 is located outside the control range 16, then the cooking hob 10 cannot be controlled by said remote device 12.

The remote device 12 sends a control command via the second wireless connection 22 and the first wireless connection 18 to the cooking hob 10 to send a predefined sound signal via the acoustic connection 20 to the remote device 12. The remote device 12 includes the microphone for receiving the sound signal and the sound checking device for checking said sound signal. If the remote device 12 recognises the sound signal within a predetermined time interval, then the remote device 12 is located inside the control range 16 and the cooking hob 10 is controllable by said remote device 12. For example, the predetermined time interval is three seconds. However, if the remote device 12 does not recognise the sound signal within the predetermined time interval, then the cooking hob 10 cannot be controlled by said remote device 12.

Alternatively or additionally to the predetermined time interval, the recognition whether the remote device 12 is located inside the control range 16 or not may also be controlled by means of a predefined sound level and/or oscillation amplitude and/or power level for the predefined sound signal which is kept below a predefined value, in that, defining the area of the control range 16.

The sound signal is a predefined sequence of tones. Preferably, the sound signal is repeated a number of times, after the control command has been sent by the remote device 12. For example, the sound signal is repeated one, two or three times. The control command is created by application software in the remote device 12. Further, said application software checks the received sound signal from cooking hob 10.

In order to increase the security in controlling the cooking hob 10, the acoustic connection 20 further comprises a unique identification signal, or the like, which is added to the predefined sound signal and/or is modulating or modifying in whatever way the predefined sound signal. This unique identification signal is randomly created by the first cooking hob 10 and transmitted to the remote device 12 together with the sound signal. The unique identification signal is recorded and transformed by the remote device 12. The transformed unique identification signal is then added to a control message, in particular to each control message, sent from the remote device 12 to the cooking hob for a program or program parameter controlling. The cooking hob 10 only accepts a control message when receiving from the remote device 12 also the transformed unique identification signal, accompanying the sound signal.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 cooking hob
12 remote device
14 router
16 control range
18 first wireless connection
20 acoustic connection
22 second wireless connection

The invention claimed is:

1. A remote control system for controlling a first domestic appliance, wherein:
the remote control system comprises the first domestic appliance and at least one remote device,
the first domestic appliance is connected to the remote device via an acoustic connection, and
the first domestic appliance is controllable by the remote device when a predefined sound signal from the first domestic appliance to the remote device via the acoustic connection is recognised by said remote device.

2. The remote control system according to claim 1, wherein the first domestic appliance is only controllable by the remote device when the predefined sound signal from the first domestic appliance to the remote device via the acoustic connection is recognised by said remote device within a predefined time interval after a control command has been sent from the remote device to the first domestic appliance.

3. The remote control system according to claim 1, wherein the acoustic connection is a unidirectional connection from the first domestic appliance to the remote device.

4. The remote control system according to claim 1, wherein the remote device is a smartphone, a tablet, a notebook or the like.

5. The remote control system according to claim 1, further comprising at least one of a further device or a second domestic appliance arranged in a joint network with the first domestic appliance, wherein
the first domestic appliance is connected to the further device or the second domestic appliance via a first connection,
the remote device is connected to the further device or the second domestic appliance via a second connection, and
the first domestic appliance is controllable by the remote device via the further device or the second domestic appliance when the predefined sound signal from the first domestic appliance to the remote device via the acoustic connection is recognised by said remote device,
and wherein the first domestic appliance is only controllable by the remote device when the predefined sound signal from the first domestic appliance to the remote device via the acoustic connection is recognised by said remote device within a predefined time interval after a control command has been sent from the remote device to the first domestic appliance via the second wireless connection, the further device or the second domestic appliance and the first wireless connection.

6. The remote control system according to claim 5, wherein the further device arranged in the joint network with the first domestic appliance is a network coupling device adapted to receive, to process and/or to transmit commands.

7. The remote control system according to claim 5, wherein the first connection between the first domestic appliance and the further device or the second domestic appliance is a wireless local area network (WLAN) connection or a local area network (LAN) connection, and/or wherein the second connection between the at least one remote device and the further device or the second domestic appliance is a wireless local area network (WLAN).

8. The remote control system according to claim 1, wherein the remote device includes application software for generating the control command and/or for recognising the predefined sound signal.

9. The remote control system according to claim 1, wherein the acoustic connection is secured by a unique identification signal which is added to the predefined sound signal or modulating the predefined sound signal.

10. A method for controlling a first domestic appliance by at least one remote device via the remote control system according to claim 1, wherein the first domestic appliance is connected to the remote device via said acoustic connection, and wherein the method comprises the steps of:
sending a control command from the remote device to the first domestic appliance,
sending said predefined sound signal, comprising a predefined sequence of tones, from the first domestic appliance to the remote device via the acoustic connection,
when the predefined sound signal is recognised by the remote device within a predefined time interval, the first domestic appliance being controllable by said remote device, and
when the predefined sound signal is not recognised by the remote device within the predefined time interval, the first domestic appliance being not controllable by said remote device.

11. The method according to claim 10, wherein the predefined time interval is between one and five seconds.

12. The method according to claim 10, wherein the predefined sound signal from the first domestic appliance to the remote device via the acoustic connection is repeated after the control command from the remote device to the domestic appliance has been sent.

13. The method according to claim 10, wherein the first domestic appliance is controlled by the remote device via a further device or a second domestic appliance arranged in a joint network with the first domestic appliance, wherein:
the first domestic appliance is connected to the further device or the second domestic appliance via a first connection,
the remote device is connected to the further device or the second domestic appliance via a second connection, and
the first domestic appliance is controllable by the remote device via the further device or the second domestic appliance when the predefined sound signal from the first domestic appliance to the remote device via the acoustic connection is recognised by the remote device.

14. The method according to claim 10, wherein the acoustic connection further comprises a unique identification signal which is added to the predefined sound signal and/or is modulating the predefined sound signal.

15. The method according to claim 14, wherein the unique identification signal is recorded and transformed by the remote device, wherein the transformed unique identification signal is added to a control message sent from the remote device to the first domestic appliance for a program or program parameter controlling, and wherein the first domestic appliance accepts said control message only when receiving also the transformed unique identification signal.

16. The method according to claim 14, said unique identification signal being randomly created by the first domestic appliance.

17. A wireless appliance control system, comprising a domestic appliance wirelessly connected to a router via a first wireless connection, and a remote control device wirelessly connected to the router via a second wireless connection; the domestic appliance comprising a sound generator adapted to generate a first sound signal in response to said domestic appliance receiving a first control command from said remote control device via said first and second wireless connections; the remote control device comprising a microphone adapted to receive said first sound signal; said domestic appliance being controllable by said remote control device in relation to said first control command only if said remote control device recognizes said first sound signal received by said microphone within a predetermined time interval following generation thereof indicating that said remote control device is within a predetermined distance from said domestic appliance.

18. The control system according to claim 17, said sound generator being adapted to generate a second sound signal in response to the domestic appliance receiving a second control command from said remote control device via said first and second wireless connections, wherein said domestic appliance is controllable by said remote control device in relation to said second control command only if said control device recognizes said second sound signal received by said microphone within said predetermined time interval following generation thereof indicating that said remote control device is within said predetermined distance from said domestic appliance.

19. The control system according to claim 17, said sound generator being further adapted to incorporate with or into the first sound signal a unique identification signal that is randomly created by the domestic appliance, said remote control device being further adapted to transform the unique identification signal received by said microphone and to add the transformed signal to a first control message transmitted from the remote control device to the domestic appliance via said first and second wireless connections, said domestic appliance being adapted to accept said first control message only if said first control message is accompanied by the transformed unique identification signal.

* * * * *